(12) United States Patent
Cathala

(10) Patent No.: US 6,994,395 B2
(45) Date of Patent: Feb. 7, 2006

(54) MOTOR VEHICLE EQUIPMENT MODULE

(75) Inventor: Franck Cathala, Maurepas (FR)

(73) Assignee: Valeo Systemes d'Essuyage, (FR)

( * ) Notice: Subject to any disclaimer, the term of this patent is extended or adjusted under 35 U.S.C. 154(b) by 0 days.

(21) Appl. No.: 10/475,389

(22) PCT Filed: Mar. 15, 2002

(86) PCT No.: PCT/FR02/00925

§ 371 (c)(1),
(2), (4) Date: Oct. 20, 2003

(87) PCT Pub. No.: WO02/088496

PCT Pub. Date: Nov. 7, 2002

(65) Prior Publication Data

US 2004/0130177 A1   Jul. 8, 2004

(30) Foreign Application Priority Data

Apr. 30, 2001 (FR) .................................. 01 06096

(51) Int. Cl.
E05B 17/00 (2006.01)
B60J 5/10 (2006.01)
B60S 1/58 (2006.01)
B62D 65/00 (2006.01)

(52) U.S. Cl. .......................... 296/193.04; 296/146.15; 296/146.8; 296/96.17; 49/503; 292/216; 15/250.31

(58) Field of Classification Search ................. 296/56, 296/96.15, 106, 146.15, 146.16, 193.04, 296/146.1, 146.2, 146.8, 146.9, 96.17; 15/250.001, 15/250.3, 250.31; 292/216, 201, DIG. 23, 292/DIG. 43; 49/503
See application file for complete search history.

(56) References Cited

U.S. PATENT DOCUMENTS

| | | | |
|---|---|---|---|
| 5,621,942 A * | 4/1997 | Eustache et al. ........... | 15/250.3 |
| 5,799,358 A * | 9/1998 | Unverrich ................ | 15/250.01 |
| 5,924,324 A * | 7/1999 | Kilker et al. .............. | 74/89.18 |
| 6,019,418 A * | 2/2000 | Emerling et al. ........ | 296/146.8 |
| 6,109,672 A * | 8/2000 | Ponziani ..................... | 292/223 |
| 6,123,384 A * | 9/2000 | Eustache et al. ......... | 296/146.2 |
| 6,240,593 B1 * | 6/2001 | Murata ...................... | 15/250.3 |
| 6,416,106 B2 * | 7/2002 | Ponziani ...................... | 296/56 |
| 6,493,900 B1 * | 12/2002 | Koumo et al. ............. | 15/250.3 |
| 6,606,760 B1 * | 8/2003 | Koumo et al. ............. | 15/250.3 |
| 6,637,801 B1 * | 10/2003 | Eustache et al. ............ | 296/106 |
| 6,746,072 B1 * | 6/2004 | Romesburg et al. ........ | 296/106 |

(Continued)

FOREIGN PATENT DOCUMENTS

FR    2 796 915    2/2001

(Continued)

Primary Examiner—Patricia L. Engle
(74) Attorney, Agent, or Firm—Young & Basile, P.C.

(57) ABSTRACT

A motor vehicle equipment module includes a lock formed of a bolt received in a housing designed to be mounted on a support part and a striker designed to be mounted on a mobile part along a globally axial direction relative to the support part between an open position and a closed position wherein the bolt cooperates with the striker. When the module is delivered to be installed on the vehicle, the striker and the bolt are linked together by an intermediate plate for temporarily indexing the position of the bolt relative to the position of the striker and to facilitate mounting and fixing of the module on the vehicle.

22 Claims, 7 Drawing Sheets

U.S. PATENT DOCUMENTS

| | | | |
|---|---|---|---|
| 6,834,906 B2 * | 12/2004 | Vaitus et al. | 296/106 |
| 2004/0124664 A1 * | 7/2004 | McClure et al. | 296/146.8 |
| 2004/0150250 A1 * | 8/2004 | Gougeon et al. | 296/146.8 |
| 2004/0245801 A1 * | 12/2004 | Gates et al. | 296/146.8 |

FOREIGN PATENT DOCUMENTS

| | | | | |
|---|---|---|---|---|
| JP | 53013734 A | * | 2/1978 | 15/250.3 |
| JP | 55083643 A | * | 6/1980 | 15/250.3 |

* cited by examiner

MOTOR VEHICLE EQUIPMENT MODULE

BACKGROUND

The invention concerns a motor vehicle equipment module that includes a lock.

Motor vehicles include equipment modules that cluster components. It happens that one of the components is either made up of two elements or parts and that each of these two elements is fixed onto a part of the vehicle, one of which being mobile in relation to the other.

The mobile part can, for example, be an opening, such as a door or rear hatchback, which is articulatingly mounted in relation to the vehicle structure between an open and closed position. In order to hold the opening in a closed position, the module includes a locking lock.

In a known manner, the lock is made up of a bolt that can be mounted onto the fixed part and a striker that is mounted on the opening.

According to another example, the mobile part is a window panel that is movably mounted onto an opening such as the vehicle hatchback in such a way as to obstruct an opening. In addition, the window panel can be articulate via its upper edge around an axis horizontal in direction in relation to the opening.

In order to hold the window panel articulated in a closed position, the vehicle can be equipped with a lock made up of a bolt and a striker that are fixed onto the opening and onto the window panel respectively.

In order to assure optimal functioning of the lock, the relative position of the bolt and of the striker must be determined with precision.

Now, the fixation zones of the bolt and the striker on the fixed part and mobile part, respectively, are generally created in production units or different machines. As a consequence, manufacturing dispersions do not allow positioning of the fixation zones of the bolt in relation to the fixation zones of the striker in a reliable and repetitive manner.

In order to allow functioning of the lock despite manufacturing dispersions, it is thus necessary to foresee adjustment operations of the striker and/or the bolt during their assembly.

In order to do this, in a known manner, the bolt is fixed onto the fixed part, then the mobile part is opened and the striker is fixed, that is to say, the fixation device allows a light adjustment of the final position of the striker in relation to the mobile part.

Next, the mobile part is closed in such a way so that the striker and the bolt work together; the position of the striker being thus defined with precision.

Then the mobile part is opened again and the striker is immobilized onto the mobile part.

The fixation of the lock onto the vehicle thus necessitates a significant number of manipulations, which increases the time of vehicle assembly.

The module can also include a wiper device made up of a motor and a drive shaft, which are each fixed onto the fixed part and onto the mobile part respectively in such a way as that they are coupled when the mobile part is in a closed position.

In this way, in addition to the relative position of the bolt and striker, one must foresee the relative position of the motor and the drive shaft, which increases the number of adjustment operations, as well as their complexity.

SUMMARY

In order to resolve these problems, the invention proposes a motor vehicle equipment module including a lock made up of a first component, which is a bolt received into a housing or a striker, designed to be mounted onto a support part, such as a vehicle opening, and a second component, which is a striker or a bolt received in a housing respectively, designed to be mounted onto a part, such as a window opening panel, which is mobile generally in the axial direction in relation to the support part, between an open and closed position in which the bolt cooperates with the striker, characterized in that, during the delivery of the module for its fixation onto the vehicle, the two components of the lock are linked together via an intermediate plate that allows temporarily indexing of the position of the bolt in relation to the position of the striker in order to facilitate the mounting and the fixation of the module onto the vehicle.

According to other characteristics of the invention:
- the equipment module includes a wiper device of the mobile part which is made up of an drive motor fixed onto the support part and, of a bearing which is fixed onto the mobile part and which axially receives in rotation a drive shaft of a wiper arm that is coupled with the exit shaft of the motor when the mobile part is in a closed position, and during the delivery of the module for its fixation onto the vehicle, the exit shaft and the bearing are linked together via the intermediate plate which allows temporarily indexing the position of the exit shaft of the motor in relation to the position of the bearing;
- the first component of the lock and the bearing are borne via a common support element;
- the first component of the lock and/or the bearing are created as one piece with a common support element, notably via casting;
- the intermediate plate includes first means for temporarily holding and positioning with the common support element and second means for positioning of the second component of the lock and/or the motor according to an axial direction;
- the plate includes second means of temporarily holding the second component of the lock and/or the exit shaft of the motor.
- the intermediate plate is created as one common piece with at least one of the means of temporarily holding and/or positioning, notably via casting;
- the motor and the second component of the lock comprise a common fixation point onto the support part of the vehicle;
- the motor and the second component of the lock are borne by a common linking element;
- the linking element forms a part of the second component of the lock and/or motor.

BRIEF DESCRIPTION OF THE DRAWINGS

Other characteristics and advantages of the invention will appear in the reading of the detailed description that follows, for which one will refer to the attached drawings in which.

DETAILED DESCRIPTION

In the following description, the motor vehicle equipment module includes in a non-limited manner, a lock and a wiping mechanism.

Other components such as a brake light, rear vision device and/or light for the license plate, can be produced with the module without leaving the scope of the invention.

In order to facilitate the comprehension of the description, the orientations front, rear, upper and lower will be used, in a non-limiting manner, conforming to the right to left orientation and from top to bottom of FIGS. 1 to 3, and 5 to 7.

Figure 1:
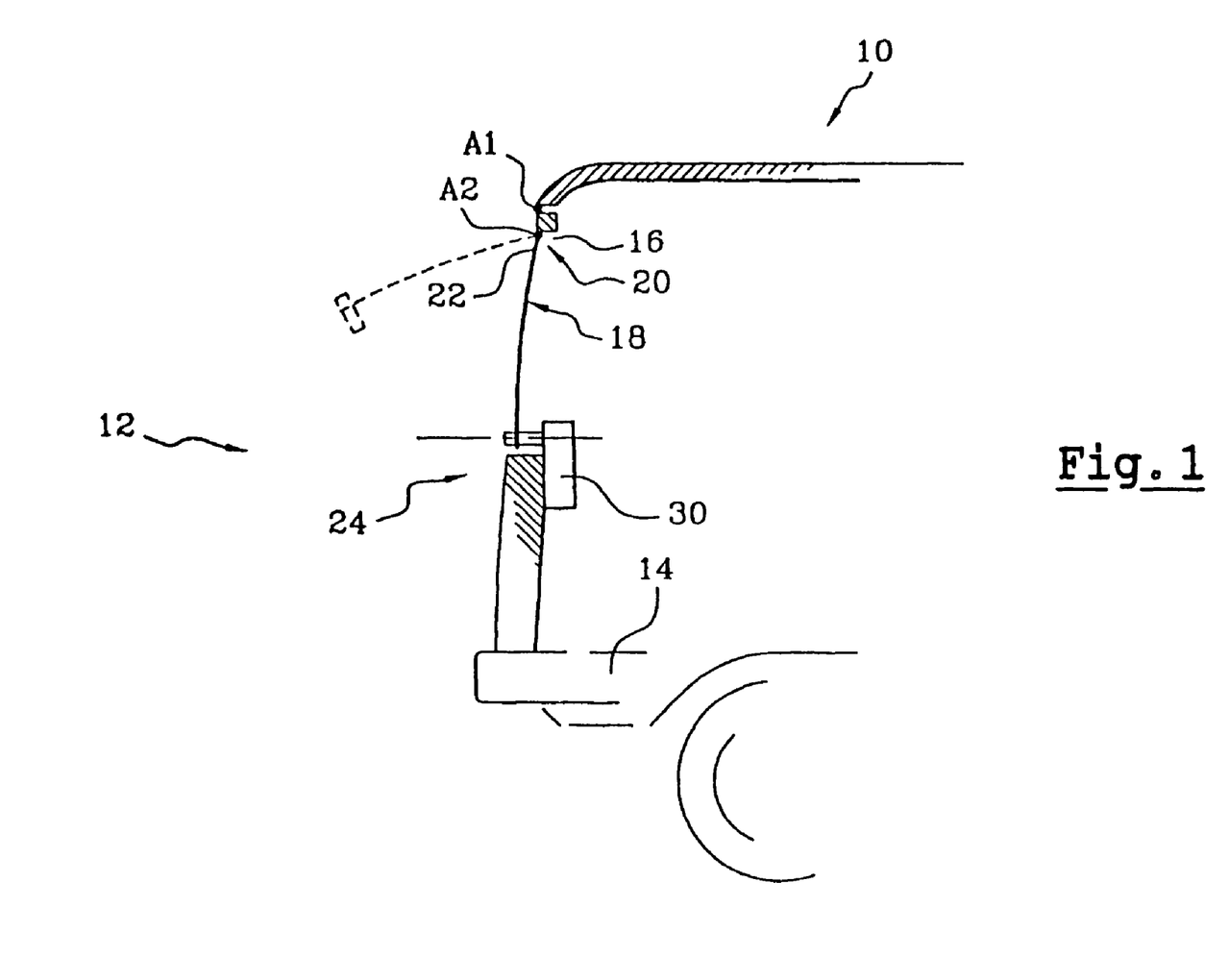
FIG. 1 is a schematic view in a section via a vertical and longitudinal plane from the rear of a motor vehicle.
Figure 2:
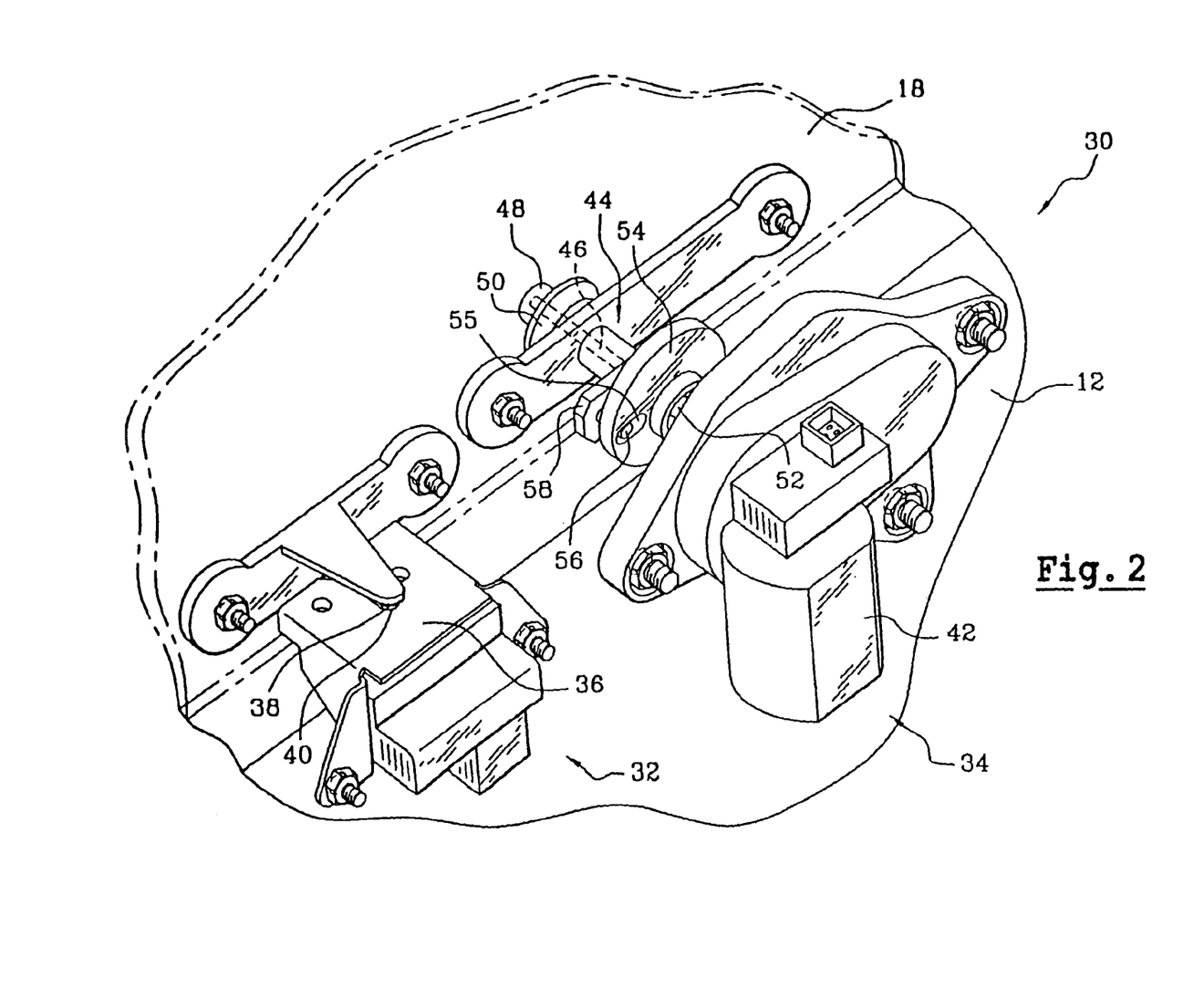
FIG. 2 is a perspective view of a motor vehicle equipment module produced according to the state of the art.
Figure 3:
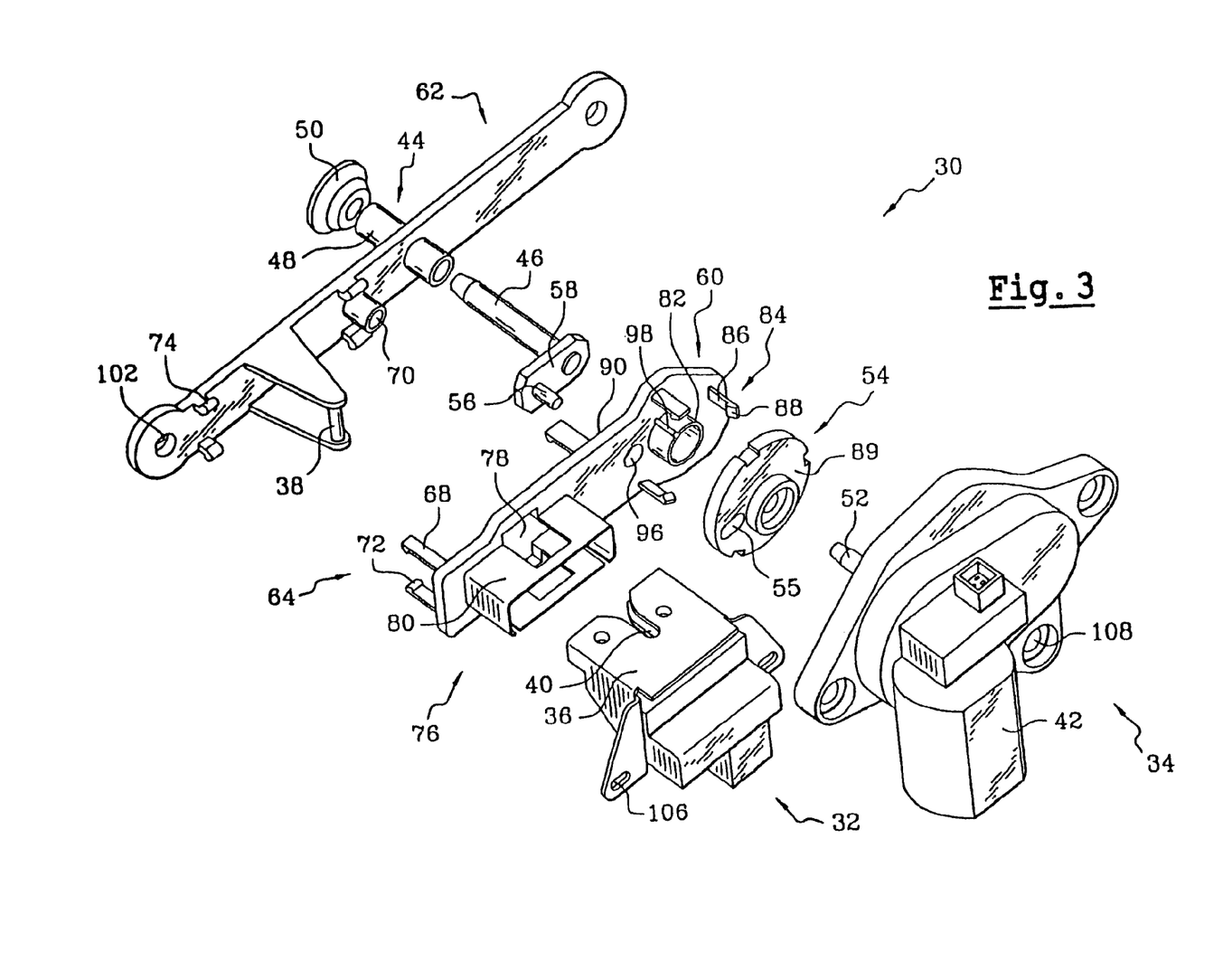
FIG. 3 is an exploded perspective view of a motor vehicle equipment module comprising an intermediate plate for temporarily indexing the position of a bolt and of a motor in relation to the position of a striker and a bearing of a lock and of a wiper device, respectively, produced according to the invention.

FIG. 1 represents in a schematic manner the rear part of a motor vehicle 10 including a support part which is here a rear opening or hatchback 12 that can be articulatingly mounted in relation to the structure 14 of the vehicle 10 according to an axis A1 with a horizontal axis.

The rear opening 12 includes, in its upper part, an opening 16 that is blocked by a mobile part which is here a window panel 18.

According to a variance, the support piece can consist of a structural element of the vehicle and the mobile part of the opening articulated in relation to the support piece.

The window panel 18 can be made up of a reinforcement and an attachment frame that receives a window. The reinforcement and attachment frame allows linking the window to an opening 12 of the vehicle via intermediate linking means 20.

The window panel 18 can also be simply made up of a window that is linked to the opening 12 of the vehicle via intermediate linking means 20.

Here, the linking means 20 consist of an articulation axis A2 that is situated on the upper edge 22 of the window panel 18. In this way, the window panel 18 mobily is mounted between a closed position represented by the solid line and an open position represented by the dotted line in FIG. 1.

The rear opening 12 is equipped in the lower zone 24 with an equipment module 30 that here includes a lock 32 and a wiping device 34 of the window of the window panel 18.

The lock 32 is made up of a first component that is here, in a non-limiting manner, a bolt that is attached in a housing 36 mounted on the lower zone 24 of the rear opening 12 and a second component that is here a striker 38 that is mounted on the internal face of the window panel 18.

When the window panel 18 is in a closed position, the striker 38 is received in a slit opposite 40 from the housing 36 which emerges towards the front, and cooperates with the bolt, suitable for assuring the locking of the striker 38 in the bottom rear of the slit 40 in such a way as to prevent its movement towards the front and to lock the position of the window panel 18 in a closed position.

The bolt is a mobile element between a locking position that blocks the striker 38 in the bottom rear of the slit 40, and in an open position in which the striker 38 can freely exit the slit 40 towards the front in such a way as to permit pivoting of the window panel 18 towards its open position.

The bolt can be returned to the locking position via elastic means such as a spring, release of the striker 38 thus being obtained via action of a opening handle that controls the passage of the bolt in an opening position.

In this way, when the user desires to maneuver the window panel 18 towards its open position, he operates the opening handle and simultaneous exerts effort towards the rear onto the window panel 18.

According to a variance, the bolt is motorized, notably by an electric motor. In this way the locking or release of the striker 38 is obtained by control of an electric circuit.

In the following description, when one references the position of the bolt, it refers to is position in relation to the other elements, notably in relation to the striker, and not its locked or open position.

The wiper device 34 is principally made up of a drive motor 42 fixed on the rear opening 12 and of a rear bearing 44 fixed on the window panel 18. The rear bearing 44 receives, rotating axially, a drive shaft 46 of a wiper arm, not shown.

The rear bearing 44 includes an axial shaft 48 that crosses the window panel 18.

In order to assure the water-tightness of the exterior and interior of the vehicle 10, a joint 50 is mounted around the free rear end of the shaft 48.

The drive shaft 46 is coupled in rotation with the exit shaft 52 of the motor 42 when the window panel 18 is in a closed position.

The coupling between the drive shaft 46 and the exit shaft 52 of the motor 42 in a known manner is principally made up of a plate 54 that is solidified to the exit shaft 52 and that includes a radial slot 55 and a crank 58 that is fixed, by soldering by example, to the free rear end of the drive shaft 46.

The crank 58 bears a drive rod 56 that is arranged in an off-center zone in relation to the drive shaft 46.

The coupling consists of the cooperation of the drive rod 56 in the radial light 55 which allows transmission of rotational movement of the exit shaft 52 to the drive shaft 46.

The positioning of the striker 38 in relation to the slit 40 of the housing 36 and to the bolt, as well as to the positioning of the bearing 44 in relation to the exit shaft 52 of the drive motor 42 (notably to plate 54), must be produced with precision so that the lock 32 can lock the position of the window panel 18 and so that the drive motor 42 can drive the drive shaft 46 of the wiper arm in alternating rotation.

However, as in the preceding description, the positioning of the striker 38 in relation to the bolt as well as that of the exit shaft 52 in relation to the guiding bearing 44 requires numerous operations.

In order to resolve this problem, the invention proposes that, during the delivery of the equipment module 30 for its fixation to the vehicle, the striker 38 and the bolt are linked together via an intermediate plate 60 that allows temporarily indexing the position of the bolt in relation to the position of the striker 38 in such a way as to facilitate the mounting and fixation of the module 10 onto the vehicle.

Referring to FIGS. 4 to 7, in order to facilitate the assembly of the striker 38 and the bearing 44 onto the window panel 18, the striker 38 and the bearing 44 are borne by a common support element 62 that is, for example, produced as one piece, notably by casting.

The intermediate plate 60 includes first means for temporarily holding and positioning 64 with the common support element 62.

The first means 64 for temporarily holding and positioning are here made up of a rod 66 and prongs 68 that extend towards the back according to an axial direction, that is to say, the front-back longitudinal axis of the vehicle.

When the intermediate plate 60 is assembled with the common element 62, via an axial translation movement, the rod 66 is engaged in a complementary orifice 70 produced in the common support element 62, and the free ends of the prongs 68, created in the form of hooks 72, cooperate with the pins 74 of the common element 62.

The complementary rod 66 and the orifice 70 block the transversal displacement of the common support element 62 in relation to the intermediate plate 60.

The prongs 68 first, block rotation around the rod 66 from the plate 60 in relation to the common element 62 during delivery of the module and its attachment onto the vehicle.

The intermediate plate 60 also includes second means for positioning 76 that notably allow the positioning of the bolt, here via intermediate of the housing 36, in relation to the intermediate plate 60.

The second means for positioning 76 are made up of a recess 78 from the periphery of which an apron 80 extends axially towards the rear. The recess 78 is complementary to the rectangular transversal section of the housing 36. In this way, the apron 80 allows axially guiding of the housing 36.

During the delivery of the module 30 the housing 36 that includes the bolt of the lock 32 must be held in relation to the striker 38.

According to a non-represented solution, the holding can be obtained via prongs similar to the prongs 68 the ends of which are hook-shaped cooperating with a complementary shape of the housing 36.

Here, the holding is obtained via cooperation of the bolt and the striker 38, the bolt allowing locking the position of the striker 38.

In this way, the position of the two principal components of the lock 32 is indexed, that is to say that their relative position corresponds to the relative position in which they are found when the window panel 18 is in a closed position. In addition, as long as the bolt is not operated, the striker 38 is not released.

The invention also proposes that, during delivery of the module 30 with a view to its attachment onto the vehicle, the exit shaft 52 of the motor 42 of the wiper device 34 and the bearing 44 are linked together via the intermediate plate 60 that allows temporarily indexing the position of the exit shaft 52 in relation to the position of the bearing 44.

Here, given that the bearing 44 is produced as one single piece with the striker 38, the bearing 44 is held in position in relation to the intermediate plate 60 by the first holding and positioning means 64.

In the situation which the bearing 44 and the striker 38 are produced in two independent elements, the plate 64 thus includes specific means for temporarily holding and positioning the bearing 44.

The second positioning means 76 here includes an annular apron 82 that is axially aligned with the exit shaft 52 of the motor 42 and which cooperates with a cylindrical recess, not represented, produced in the front face of the plate 54.

The intermediate plate 60 also includes second temporary holding means 84 that are made up of prongs 86 the ends of which are hook-shaped 88 and cooperate with the front annular face 89 of the plate 54 in order to hold it assembled in the intermediate plate 60.

So that, during the assembly of the equipment module, the drive shaft 46 is coupled with the exit shaft 52 of the motor, the crank 58 as well as the plate 54 are angularly positioned by the intermediate plate 60.

Figure 4:
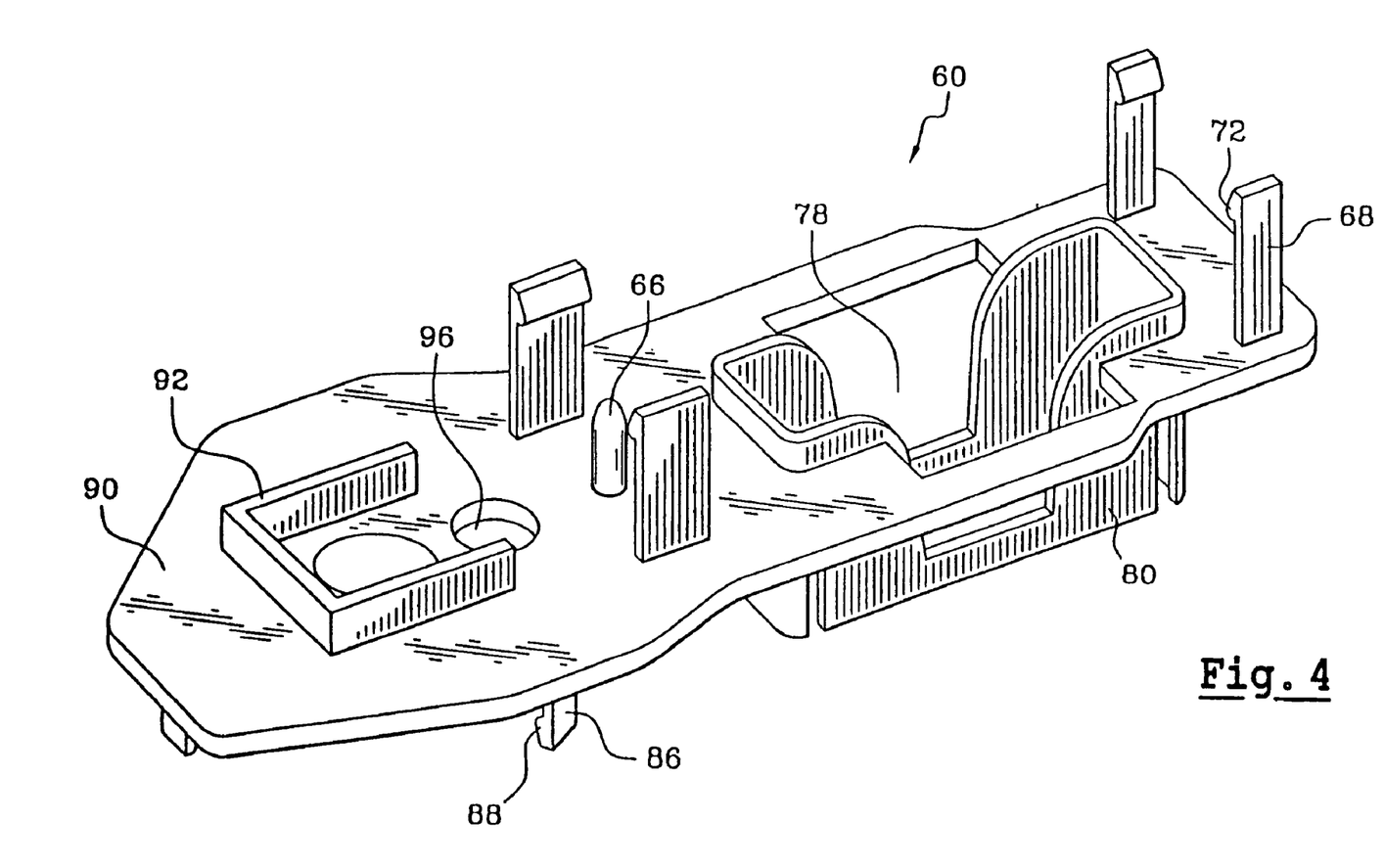
FIG. 4 is a perspective view along another direction of the indexing intermediate plate.

Referring to FIG. 4, the rear face 90 of the intermediate plate 60 comprises a U-shaped rib 92 in which the crank 58 is received. The opening of the U-shaped rib 92 allows the passage of the crank which bears the drive rod 56 received with an aperture 96.

In this way, when the intermediate plate 60 and the common support element 62, the bearing 44 of which receives the drive shaft 46, are attached, there exists a single determined angular position of the crank 58.

In order to angularly position the plate 54 in relation to the drive shaft 46, notably in relation to the rod 56, in order to cooperate with the slot 55, the annular apron 82 comprises a rib 98 which extends axially onto the exterior periphery and which cooperates with a complementary groove created in the cylindrical recess of the plate 54.

So that the rod 56 is engaged in the light 55 during the assembly of the equipment module 30, the angular position of the rod 56 in relation to the rib 98 is identical to the angular position of the light 55 in relation to the groove created in the cylindrical recess of the plate 54.

Figure 5:
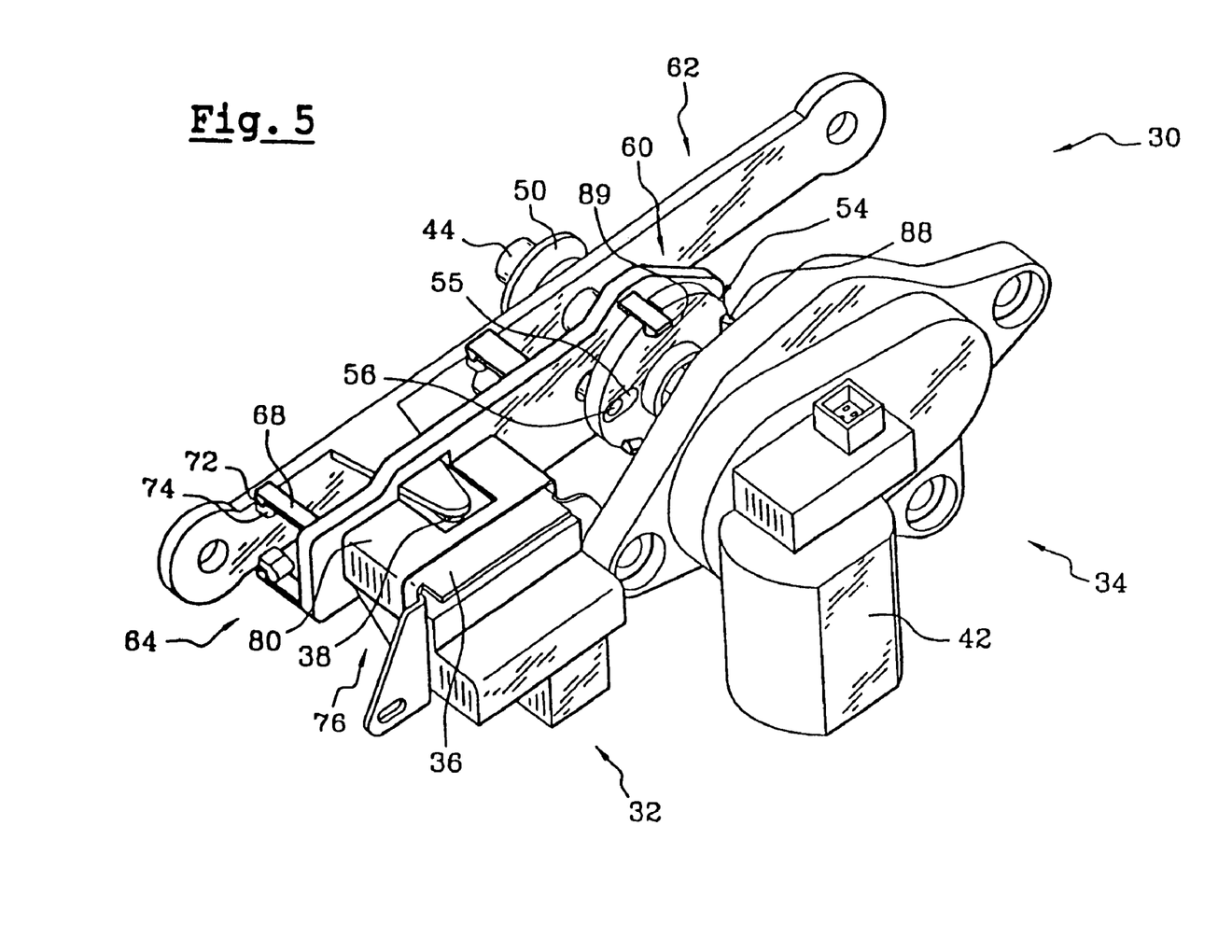
FIG. 5 is a perspective view of the equipment module represented in FIG. 3, the lock and wiper device elements being linked by the intermediate plate.

Referring to FIG. 5, the intermediate plate 60 thus permits positioning diverse elements making up the module 30, notably the lock 32 and the wiper device 34, according to an arrangement which corresponds to that of the module 30 when it is fixed onto the vehicle 10.

This allows facilitating the operation of attaching the module 30 onto the vehicle.

In a known manner, two studs 100 are glued onto the window panel 18. During the mounting of the module 30, the studs 100 crossing the fixation holes 102 of the common support element 62.

In order to be able to adjust the position of the common element 62, the interior diameter of the fixation holes 102 is greater that the exterior diameter of the studs 100.

The rear opening includes in a similar manner, studs 104 that cross the fixation holes 106 and 108 of the lock 32 and the wiper motor 42.

In this way, during the assembly of the module 30 onto the vehicle, the operator positions the module 30 so that the free front end of the bearing 44 crosses the corresponding passage orifice 110 created in the window panel 18 and that the studs 100 and 104 cooperate with the fixation holes 102, 106, and 108.

Then, its work consists simply of screwing and tightening the nuts 112 onto the studs 100 and 104 in order to attach the common element 62 onto the window panel 18 as well as to the housing 36 of the bolt of the lock 32 and motor 42 of the wiper device 34 onto the rear opening 12 respectively.

In this way, the operation of affixing the module 30 is largely simplified since it is produced, from the interior of the vehicle, in one single operation without manipulating the window panel 18.

When this operation is complete, the operator engages the bolt of the lock 32 in order to release the striker 38, and then it opens the window panel 18. The opening effort exerted on the window panel 18 must be sufficient to provoke the separation of the intermediate plate 60 from the common element 62 of the common support or of the plate 54.

Next, the operator separates the intermediate plate 60 from the part of the module 30 onto which it temporarily rests.

The first and second holding means 64, 84 are dimensioned so that the effort of opening the window panel 18, as well as the effort of separation, are not too significant.

The intermediate plate 60 can thus be recycled or be sent to the assembly place of equipment modules 30 to be reused.

Figure 7:
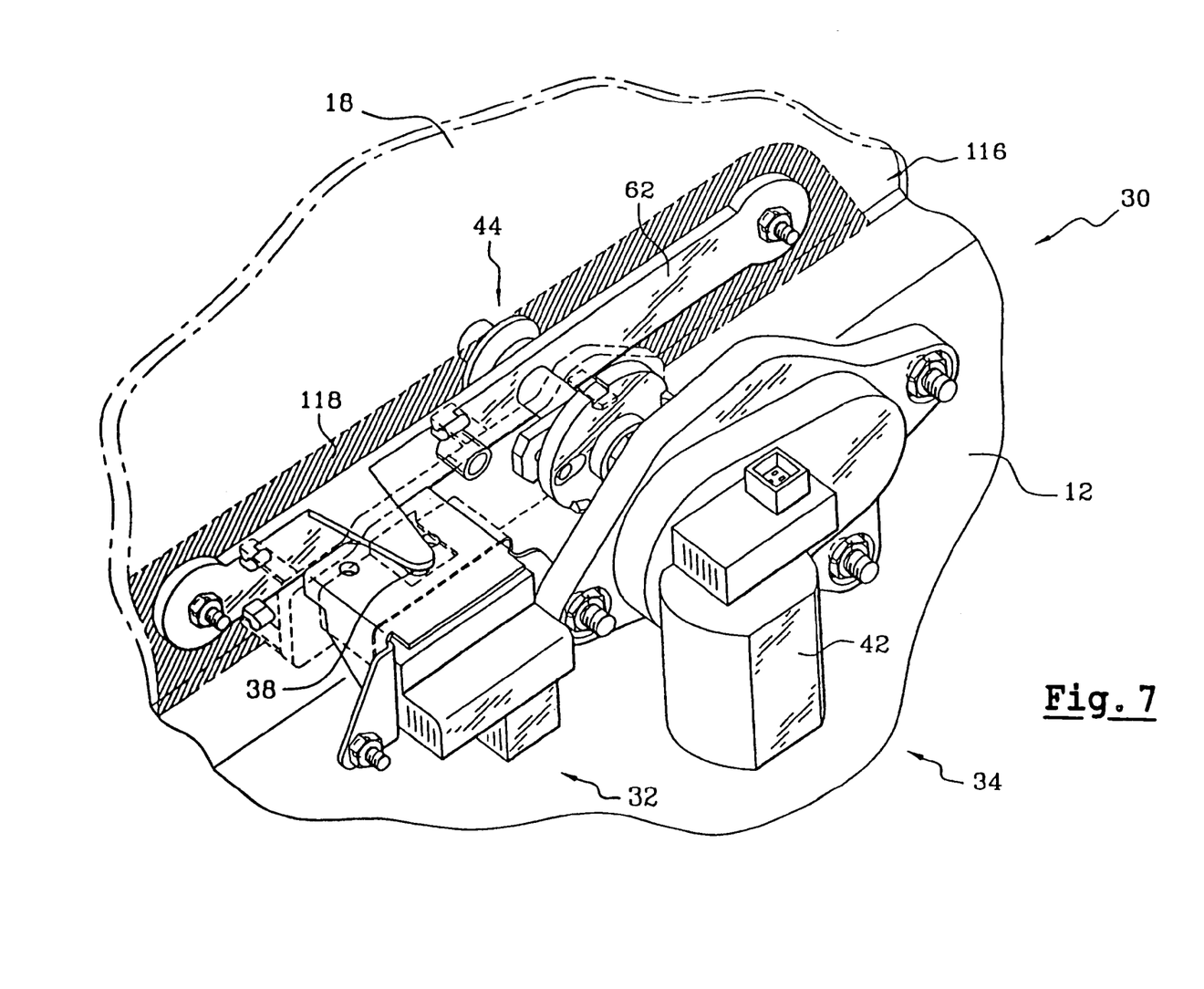
FIG. 7 is a perspective view of the equipment module assembled onto the vehicle after the removal of the temporary indexing intermediate plate.

Next, the window panel 18 is closed as shown in FIG. 7. The relative position of the bolt in relation to the striker 38, as well as the relative position of the exit shaft 52 of the motor 42 in relation to the bearing 44, are identical to the relative positions of these elements when the intermediate indexing plate 60 is assembled.

In order to illustrate this, the plate 60 is represented in silhouette in FIG. 7, even though it is no longer part of the module 60.

The separation of the intermediate plate 60 can be produced just after the affixation of the module 30 onto the vehicle, but it can also be produced later, during a subsequent assembly step of the vehicle which necessitates the opening of the window panel 18.

In order to further diminish the duration of the attachment operation, the lock 32 and the wiper device 34 can include a common fixation zone.

Figure 6:
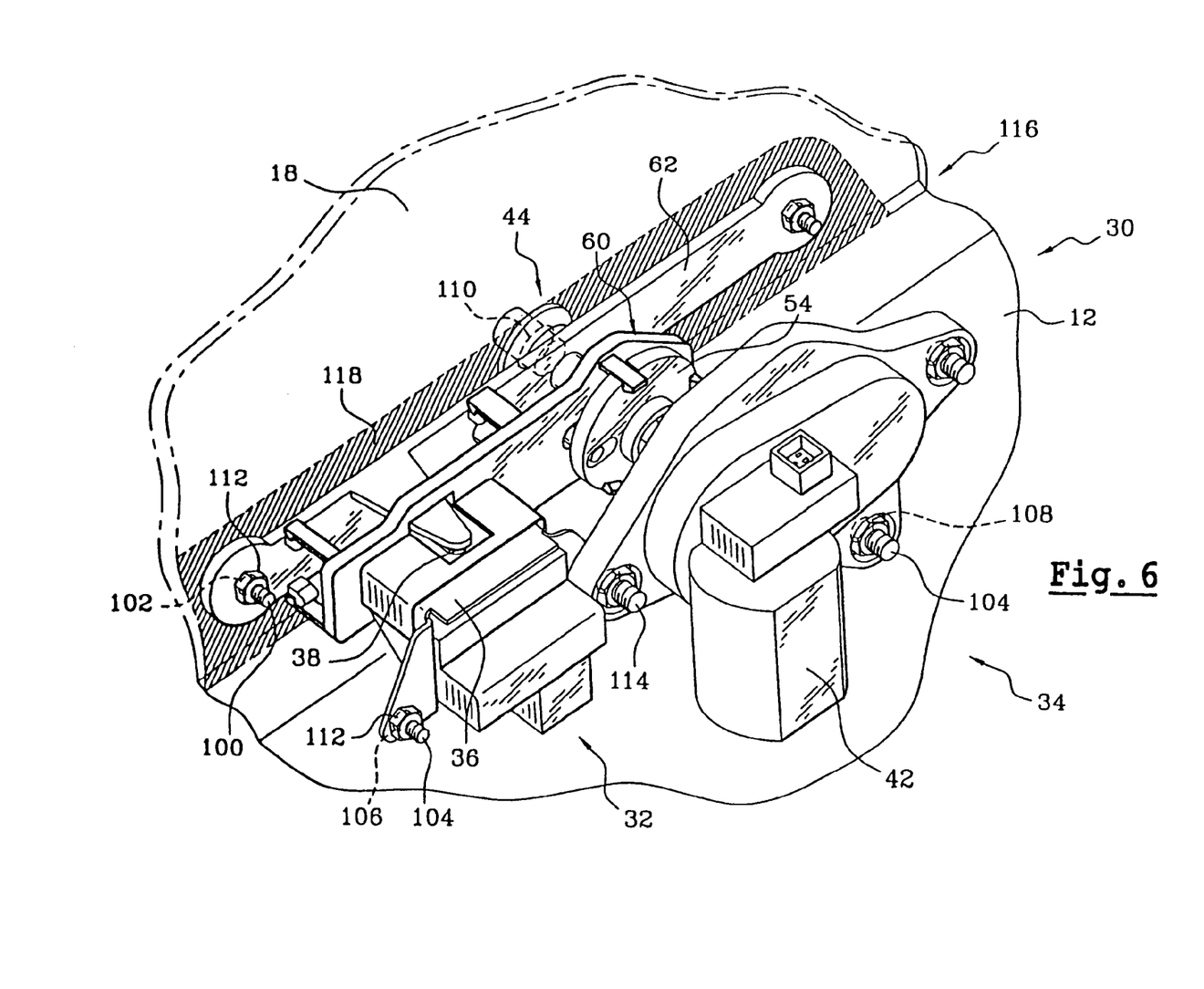
FIG. 6 is a perspective view of the equipment module represented in the preceding figure during its assembly onto the rear opening of a motor vehicle.

Referring to the FIG. 6, an attachment hole 106 of the housing 36 and an attachment hole 108 of the closing plate of the motor 42 are crossed by a common stud 114. Thus, the operator needs to screw and tighten one fewer nut.

Advantageously, the common linking element forms a part of the second component of the lock 32 and/or motor 42. For example, the common linking element can form the housing 36 of the lock 32. It can also form the closing plate of the motor 42.

The lower part 116 of the window panel 18 can advantageously includes a tinted zone 118 opposite from the equipment module 30. The zone 118 allows masking the module 30 from the exterior of the vehicle, in order to improve the rear aesthetic.

The preceding description is not limiting. In effect, without leaving the scope of the invention, the first component can be the striker 38 of the lock 32 and the second component can also be the bolt. In this case, the striker 38 is mounted onto the rear opening 12 and the bolt is mounted onto the internal face of the window panel 18. In a similar manner, the two components of the lock are linked together via an intermediate plate 60 that allows temporarily indexing of their position in relation to each other, in order to facilitate the mounting and attachment of the module 30 onto the vehicle.

What is claimed is:

1. A motor vehicle equipment module comprising a lock made up of a first component, formed of one of a bolt received in a housing and a striker, designed to be mounted on a support piece, and a second component, which is formed of one of a striker and a bolt received in a housing respectively, designed to be mounted on a part which is mobile in a generally axial direction in relation to the support part, between an open and closed position in which the bolt cooperates with the striker, characterized by, during the delivery of the module for attachment to the vehicle, the first and second components of the lock are temporarily fixed with respect to one another separate from the vehicle via an intermediate plate which allows temporarily fixturing of the position of the bolt in relation to the position of the striker in order to facilitate the mounting and the attachment of the module onto the vehicle.

2. The equipment module according to claim 1 comprising:
    a wiper device of the mobile part which is made up of a drive motor affixed onto the support part;
    a bearing which is affixed onto the mobile part and which axially receives a drive shaft of a wiper arm that is coupled with the exit shaft of the motor when the mobile part is in a closed position; and
    during the delivery of the module for attachment onto the vehicle, the exit shaft and the bearing are linked together via the intermediate plate which allows the temporary indexation of the position of the exit shaft from the motor in relation to the position of the bearing.

3. The equipment module according to claim 2, comprising:
    the first component of the lock and the bearing being carried by a common support element.

4. A motor vehicle equipment module comprising a lock made up of a first component, formed of one of a bolt received in a housing and a striker, designed to be mounted on a support piece, and a second component, which is formed of one of a striker and a bolt received in a housing respectively, designed to be mounted on a part which is mobile in a generally axial direction in relation to the support part, between an open and closed position in which the bolt cooperates with the striker, characterized by, during the delivery of the module for attachment to the vehicle, the first and second components of the lock are linked together via an intermediate plate which allows temporarily indexing the temporarily fixed with respect to one another separate from the vehicle via an intermediate plate which allows temporarily fixturing of the position of the bolt in relation to the position of the striker in order to facilitate the mounting and the attachment of the module onto the vehicle, a wiper device of the mobile part which is made up of a drive motor affixed onto the support part, a bearing which is affixed onto the mobile part and which axially receives a drive shaft of a wiper arm that is coupled with the exit shaft of the motor when the mobile part is in a closed position, and during the delivery of the module for attachment onto the vehicle, the exit shaft and the bearing are linked together via the intermediate plate which allows the temporary indexation of the position of the exit shaft from the motor in relation to the position of the bearing, the first component of the lock and the bearing being carried by a common support element, and one of the first component of the lock and bearing created as one single piece with the common support element.

5. A motor vehicle equipment module comprising a lock made up of a first component, formed of one of a bolt received in a housing and a striker, designed to be mounted on a support piece, and a second component, which is formed of one of a striker and a bolt received in a housing respectively, designed to be mounted on a part which is mobile in a generally axial direction in relation to the support part, between an open and closed position in which the bolt cooperates with the striker, characterized by, during the delivery of the module for attachment to the vehicle, the first and second components of the lock are linked together via an intermediate plate which allows temporarily indexing the position of the bolt in relation to the position of the striker in order to facilitate the mounting and the attachment of the module onto the vehicle, a wiper device of the mobile part which is made up of a drive motor affixed onto the support part, a bearing which is affixed onto the mobile part and which axially receives a drive shaft of a wiper arm that is coupled with the exit shaft of the motor when the mobile part is in a closed position, and during the delivery of the module for attachment onto the vehicle, the exit shaft and the bearing are linked together via the intermediate plate which allows the temporary indexation of the position of the exit shaft from the motor in relation to the position of the bearing, the first component of the lock and the bearing being carried by a common support element, and the intermediate plate including a first temporary holding and positioning means with the common support element and the second positioning means of one of the second component of the lock and the motor in the axial direction.

6. A motor vehicle equipment module comprising a lock made up of a first component, formed of one of a bolt received in a housing and a striker, designed to be mounted on a support piece, and a second component, which is formed of one of a striker and a bolt received in a housing respectively, designed to be mounted on a part which is mobile in a generally axial direction in relation to the support part, between an open and closed position in which the bolt cooperates with the striker, characterized by, during the delivery of the module for attachment to the vehicle, the first and second components of the lock are linked together via an intermediate plate which allows temporarily indexing the position of the bolt in relation to the position of the striker in order to facilitate the mounting and the attachment of the module onto the vehicle, a wiper device of the mobile part which is made up of a drive motor affixed onto the support part, a bearing which is affixed onto the mobile part and which axially receives a drive shaft of a wiper arm that is coupled with the exit shaft of the motor when the mobile part is in a closed position, and during the delivery of the module for attachment onto the vehicle, the exit shaft and the bearing are linked together via the intermediate plate which allows the temporary indexation of the position of the exit shaft from the motor in relation to the position of the bearing, the first component of the lock and the bearing being carried by a common support element, and the plate including second temporary holding means of one of the second component of the lock and the exit shaft of the motor.

7. The equipment module according to claim 5 comprising:
the intermediate plate created in one common piece with at least one of the temporary holding means and the positioning means.

8. The equipment module according to claim 2 comprising:
the motor and the second component of the lock including a common attachment point onto the support part of the vehicle.

9. The equipment module according to claim 2 comprising:
the motor and the second component of the lock being carried by a common linking element.

10. The equipment module according to claim 9 comprising:
the linking element forming a second component of one of the lock and motor.

11. A motor vehicle equipment module comprising:
a lock including a first component and a second component, the first component formed of one of a bolt received in a housing and a striker designed to be mounted on a support piece, and the second component formed of one of a striker and a bolt received in a housing, respectively, designed to be mounted on a part moveable in a generally axial direction in relation to the support part between an opened position and a closed position where the bolt cooperates with the striker; and an intermediate plate for linking the first and second components together allowing delivery of a single assembly temporarily combining the first and second components in a module for attachment to the vehicle, the intermediate plate allowing temporarily indexing of a position of the bolt in relation to a position of the striker in order to facilitate mounting and attachment of the module onto the vehicle.

12. The motor vehicle equipment module of claim 11 further comprising:
a wiper device of the moveable part made up of a drive motor affixed onto the support part;
a bearing affixed onto the moveable part and axially receiving a drive shaft of a wiper arm coupled with an exit shaft of the motor when the moveable part is in a closed position; and
during the delivery of the module for attachment onto the vehicle, the exit shaft and the bearing linked together via the intermediate plate allowing the temporary indexation of the position of the exit shaft from the motor in relation to the position of the bearing.

13. The motor vehicle equipment module of claim 12 further comprising:
the first component of the lock and the bearing being carried by a common support element.

14. The motor vehicle equipment module of claim 13 further comprising:
one of the first component of the lock and bearing created as one single piece with the common support element.

15. The motor vehicle equipment module of claim 13 further comprising:
the plate including second temporary holding means of one of the second component of the lock and the exit shaft of the motor.

16. The motor vehicle equipment module of claim 13 further comprising:
the intermediate plate including a first temporary holding and positioning means with the common support element and the second positioning means of one of the second component of the lock and the motor in the axial direction.

17. The motor vehicle equipment module of claim 16 further comprising:
the intermediate plate created in one common piece with at least one of the temporary holding means and the positioning means.

18. The motor vehicle equipment module of claim 12 further comprising:
the motor and the second component of the lock including a common attachment point onto the support part of the vehicle.

19. The motor vehicle equipment module of claim 12 further comprising:
the motor and the second component of the lock being carried by a common linking element.

20. The motor vehicle equipment module of claim 19 further comprising:
the linking element forming a second component of one of the lock and motor.

21. A motor vehicle equipment module comprising:
a removable fixture for holding a bolt housing module and striker module with respect to one another separate from a vehicle into which the modules are to be installed, the removable fixture including a flat planar member having two opposite surfaces, each surface having a side edge defining an outer periphery, a plurality of prongs integrally formed with the flat planar member on the opposite surfaces extending outwardly to releasibly engage with the striker module and bolt housing module, and outwardly extending sidewalls defining a plurality of apertures engageble to guide and hold the modules in a predetermined position with respect to one another.

22. The motor vehicle equipment module of claim 21 further comprising:
a plurality of prongs integrally formed on the opposite surfaces extending outwardly to releasibly engage with a wiper device of a mobile part and outwardly extending sidewalls defining a plurality of apertures allowing for passage of a bearing and an exit shaft of the wiper device through the flat planar member.

* * * * *